United States Patent Office 3,553,156
Patented Jan. 5, 1971

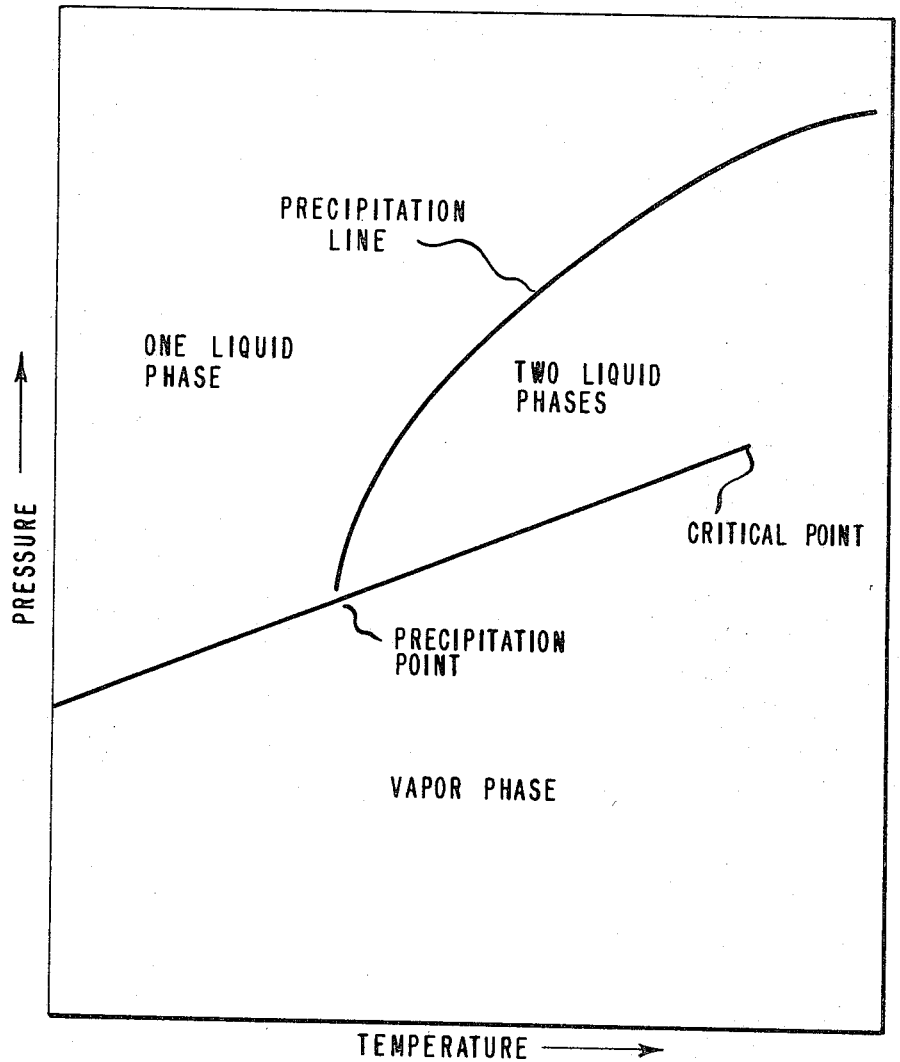

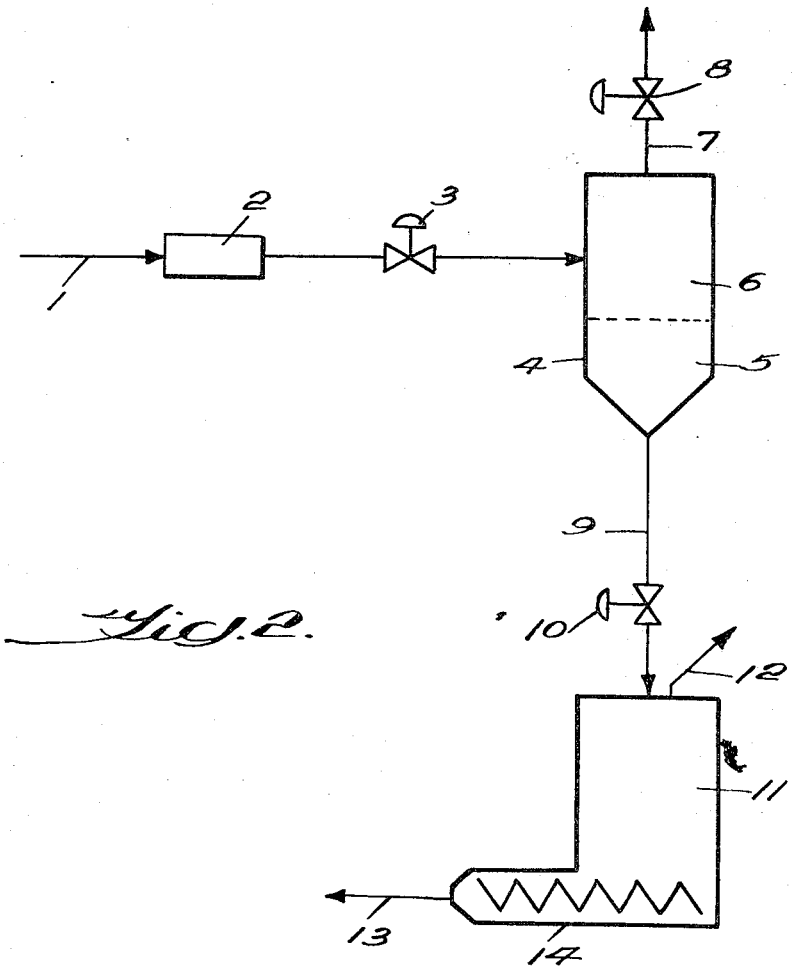

3,553,156
SEPARATION OF ETHYLENE COPOLY-
MER ELASTOMERS FROM THEIR SOL-
VENT SOLUTIONS
Colin Anolick and Edward Peter Goffinet, Jr., Wilmington, Del., assignors to E. I. du Pont de Nemours and Company, Wilmington, Del., a corporation of Delaware
Filed Dec. 15, 1966, Ser. No. 601,890
Int. Cl. B01d 43/00; C08d 5/00
U.S. Cl. 260—33.6    5 Claims

ABSTRACT OF THE DISCLOSURE

Separation of sulfur-curable ethylene copolymer elastomers (e.g., ethylene, propylene, 1,4-hexadiene copolymers) from their solutions in solvents (e.g., hexane) by heating under pressure to a point where two liquid phases form, the bottom phase containing most all the elastomer, decanting the bottom phase and flashing off the solvent therefrom to isolate solvent-free elastomer. Black can be incorporated by mixing into solution before decantation. If processing oil is to be included, it is mixed in after decantation but before flashing, whereas if both black and oil are to be included, they are mixed in before decantation.

BACKGROUND OF THE INVENTION

(1) Field of the invention

This invention relates to the separation of sulfur-curable ethylene copolymer elastomers from their solvent solutions and more particularly, to the performance of the separation with the simultaneous incorporation of carbon black or processing oil.

(2) Description of the prior art

Sulfur-curable ethylene copolymer elastomers are generally polymerized with coordination catalysts in a solvent so that the polymer produced is in solution and must be separated therefrom. One commercial process involves the use of tetrachloroethylene solvent which has the advantage of non-flammability but the disadvantages of low volatility and high cost. It is desirable to provide a commercial process which enables the use of low-cost solvents like hexane without incurring flammability hazards or the expense of handling large volumes of vapor.

SUMMARY

The disadvantages of prior art processes in separating sulfur-curable ethylene copolymer elastomers from solvent solutions are largely overcome by heating the solution while maintaining sufficient pressure to keep the solution in the liquid phase to a temperature and pressure at which two liquid phases form, one of which being relatively rich in copolymer, separating the copolymer-rich phase by decantation and evaporating the solvent from the copolymer-rich phase.

In a specific embodiment it is found that processing oil can be incorporated into the copolymer with surprising ease by mixing the oil into the copolymer-rich phase after decantation but before evaporation.

Moreover, it is found that carbon black, if added before decantation will surprisingly all go into the copolymer-rich phase and be completely decanted therewith.

If it is desired to incorporate both carbon black and oil, it is found that the addition of both before decantation will surprisingly cause about 60 to 80% of the oil to go into the copolymer-rich phase and be decanted therewith.

BRIEF DESCRIPTION OF THE DRAWINGS

FIG. 1 illustrates a typical phase diagram showing the behavior of solvent solutions of the polymer.

FIG. 2 is a flow sheet showing the decantation process of the invention.

DESCRIPTION OF THE PREFERRED EMBODIMENTS

The invention is first described by reference to FIG. 1.
If a solvent solution of the polymer is heated at constant pressure, thereby crossing the precipitation line, the solution will form two phases with most of the polymer (i.e., over 90%) going into the bottom phase, and the upper phase being almost pure solvent. The concentration of the polymer in the bottom phase is controlled by the amount of solvent going into the upper phase; this will vary with temperatures within the two-phase zone. For example, a given polymer in hexane was found to form a bottom phase at 190° C. where the amount of solvent was 2.6 lbs./lb. of polymer, whereas at 220° C. it dropped to 1.45 lbs./lb. polymer (pressure being just above the solution vapor pressure in both cases). It is desirable to decant a bottom phase which is at least 30 percent; preferably at least 50 percent polymer.

The exact phase diagram will vary for each different solvent and for each solvent the diagram will shift slightly according to the concentration of polymer in the solution. Further, the amount of unpolymerized monomer, such as propylene, will have its effect. If the precipitation point of the diagram is at too high a temperature (as that for tetrachloroethylene), the polymer may experience some thermal degradation if this process is used for its separation. Otherwise, the solvent is not particularly critical. The process is especially useful for separating polymers from their solutions in hydrocarbons, such as pentane, hexane or heptane, in concentrations of about 5 to 20 percent by weight.

Within the scope of this invention it is not particularly critical how the temperature and pressure are changed so as to arrive within the two-phase zone. For example, it can be by creating a desired pressure and subsequently heating at that pressure. Preferably, heat and pressure are applied to create one liquid phase condition above the precipitation line with subsequent lowering of pressure into the two-phase zone.

The process can be operated somewhat above the critical temperature and above or below the critical pressure of the solvent. It is only necessary that the temperature and pressure are selected so that both phases behave like liquids.

The process is further described with reference to FIG. 2. The polymer solution, which optionally can contain carbon black and oil, enters line 1 under pressure, and passes through heater 2 and pressure let-down valve 3 into the two-phase decanter 4, where a polymer-rich phase 5 settles from an upper phase 6 of almost pure solvent. The solvent phase leaves the decanter through line 7 and pressure let-down valve 8, and can be collected and treated for recycle use. The polymer rich phase 5 passes from the decanter through line 9 and pressure let-down valve 10 into the flash chamber 11 for removal of residual solvent. Line 9 can be provided with mixing means (not shown) for incorporation of preheated oil under pressure, where desired. Residual solvent leaves flash chamber 11 via line 12, while the flashed polymer product is removed through line 13 by extruder 14.

As previously stated it may be desirable to incorporate a processing oil into the elastomer by adding the oil after decantation but before evaporation. Preferably the oil is added, in the amount desired, to a mixer into which is decanted the polymer-rich phase. The mixing and solution of the oil and polymer-rich phase is accomplished with surprising ease. Any processing oil well known to those skilled in the art as generally applicable to the oil-extension of ethylene copolymer elastomers can be employed, e.g., those mentioned in Introduction to Rubber Technology, Ed. by M. Morton, Reinhold Publishing Co., New York, 1959, Chapter 7, and Canadian Pat. 962,519. If the oil is added to the solution before decantation, it tends to distribute much in the same way as the solvent (if no carbon black is present). It is found that the presence of oil assists in isolation of the polymer by flash evaporation by reducing the tendency for the undesirable formation of powdered polymer.

It is surprising that carbon black added to the solution before decantation all tends to go down into the polymer-rich phase. Even more surprising is that if both oil and black are added before decantation, most of the oil will go into the lower phase as well. The amounts and types of carbon black added are well known to those skilled in the art. Oil-coated carbon blacks such as described in U.S. Pat. 3,203,916 are especially suitable. Typically 30 to 150 parts of black per 100 parts of copolymer are employed.

After the phase separation has occurred, the upper solvent phase can be recovered. When water is absent, this phase is suitable for preparing more copolymer by co-ordination polymerization. The separated phase, optionally containing processing oil and/or solid filler such as carbon black, is then freed from residual solvent and monomers by flashing. Less than 1%, preferably less than 0.3% solvent remains. The drying copolymer can be formed in continuous coherent form, e.g., continuous filaments or ropes. Since most of the volatile solubilizing medium has been removed in the decantation, the flashing does not require a large, expensive vacuum system as would be the case if the copolymer solution were isolated directly by flashing of all the solubilizing media present. The present invention avoids the difficulties resulting from attempting to separate sticky dry polymer from a very large volume of vapor.

When the copolymer solution being treated is anhydrous, the volatile components separated in the last stage of the process can be returned directly to the reactor if desired. Since the process can be anhydrous, one can avoid the considerable expense of removing water from the monomers and hydrocarbon solvent before they are reused.

The copolymer solution may not always be dry before use in the process of the present invention. For example, water washing to remove catalyst residue may leave a water/oil emulsion containing up to 10% water. The vapor pressure exerted will then be the sum of that of the hydrocarbon liquid and that of the residual water. To avoid boiling during the phase separation step, the system pressure must exceed that sum. Unfortunately, the solution point of the copolymer may be approached closer than desired. As much as possible of the water should be removed ahead of time; in hexane, up to about 1 percent, preferably less than about 0.4 percent water remaining can be acceptable.

If enough water is removed prior to heating so that the residual amount is not much above the small concentration present at the solubility limit, then the water will have only a negligible influence on the pressure required at the elevated temperature of the phase separation step, because the solubility of the water is greater at higher temperatures. This method of operation is preferred. However, if the copolymer solution contains more water than this, the present invention optionally includes evaporating part of the solution before the phase separation step, thus drying the solution to an acceptable level. It may be advantageous to use as high a temperature as possible in the drying operation because the ratio of water/hydrocarbon in the vapor phase increases with temperature. But this advantage may be offset by other economic considerations.

The sulfur-curable ethylene copolymers which can be isolated by the process of the present invention are made by copolymerizing ethylene with at least one non-conjugated diene. By "sulfur-curable" it is meant that the polymer will contain at least 0.2 gram-mole of ethylenic carbon-to-carbon double bonds per kilogram. Generally, another α-monoolefin (such as propylene) having the structure R—CH=CH$_2$ where is C$_1$–C$_{16}$ alkyl is also copolymerized therewith. It is preferred that they be straight-chained, although proportions of branched α-monoolefins which do not adversely affect the rubber-like nature of the copolymer may be present, if desired. Among the others, the lower α-monoolefins, where R containing up to about 4 carbon atoms, are commercially available and preferred. Representative non-conjugated dienes include open-chain C$_6$–C$_{22}$ dienes having the structure

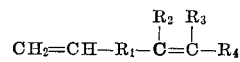

wherein R$_1$ is an alkylene radial, R$_2$, R$_3$ and R$_4$ are independently selected from the group consisting of hydrogen and alkyl radicals; the preferred dienes have only one terminal carbon-carbon double bond; 1,4-hexadiene is a particularly preferred example. Other dienes include dicyclopentadiene; 5-methylene-2-norbornene; 5-alkenyl-2-norbornene; 2-alkyl-2,5-norbornadiene; and 1,5-cyclooctadiene.

Representative copolymers and procedures for their preparation are given in U.S. Pats. 2,933,480; 3,000,866; 3,063,973; 3,093,620, 3,093,621; 3,211,709 and 3,260,708.

The process of the present invention is versatile enough to handle a wide range of polymer types. Representative ethylene/propylene/1,4-hexadiene copolymers employed have displayed Mooney viscosities (ML–4/250° F.) ranging from as low as 10.5 to at least as high as 70. The low Mooney polymer is particularly convenient to use because the polymer-rich phase is less viscous and settles cleanly. When the rubber-like copolymer has a higher Mooney viscosity, e.g., 70, the polymer-rich phase may be more viscous.

The most valuable application of the process of the present invention is in isolating the rubber-like α-olefin copolymer from a reactor effluent. The solubilizing medium, such as hexane, will thus frequently be accompanied by residual monomer such as propylene.

The invention will now be described in and by the following specific examples thereof, wherein parts and percentages are by weight unless otherwise indicated.

EXAMPLE 1

A 15 percent solution of hydrocarbon rubber in n-hexane is made in which the polymer has the following typical composition and characteristics: 34% propylene, 63% ethylene, and 3% 1,4-hexadiene. Inherent viscosity about 2 (0.1 gram of polymer in 100 ml. of perchloroethylene at 30° C.).

This solution is heated continuously at 1,400 p.s.i.g. to 220° C. and pumped at a rate of about 1,810 g./hr. through a pressure let-down valve which maintains the pressure into a decanter consisting of a high-pressure sight glass of 102 ml. volume, with a side entrance port and exits at both top and bottom. The decanter is surrounded by coils, through which hot oil flows, and is insulated. Under these conditions the solvent-polymer mixture in the decanter is at a temperature of about 220° C. The pressure in the decanter is maintained at about 380 p.s.i.g. by means of a second pressure let-down valve connected to the top decanter exit port.

Precipitation of a polymer-rich phase occurs after the first pressure let-down valve; in the decanter the polymer-rich phase settles from an upper phase of almost pure hexane. This upper phase is removed from the decanter through the top port and second pressure let-down valve and cooled before being collected in a receiver. The upper phase includes about 73.5% of all the hexane and contains about 0.3% non-volatiles consisting of a low molecular weight fraction of the polymer.

The polymer-rich phase is removed from the decanter through the bottom port connected to a needle valve and conducted through a well-insulated line to a flashing chamber, also well-insulated. The flashing chamber is maintained at a vacuum of about 5 in. of Hg absolute and at equilibrium operates at a temperature of about 140° C. The decantation rate is controlled so that there is a constant level of polymer-rich phase in the decanter.

The polymer-rich phase leaving the decanter contains about 1.5 weight parts of hexane per part of polymer but, after flashing, this is reduced so that the dried polymer product contains only about 0.4% hexane by weight at equilibrium. The dried polymer is removed from the flash chamber by a screw extruder.

EXAMPLE 2

This example illustrates operation of the invention wherein processing oil is incorporated after decantation.

An n-hexane solution containing about 15 percent of the following polymer is processed as indicated hereinafter: a terpolymer of about 60.6% ethylene, 36% propylene and 3.4% 1,4-hexadiene monomer units having an inherent viscosity of about 2.14 (measured as in Example 1), Mooney viscosity (ML–4/250° F.) 37.

The polymer solution is pressurized to about 1,100 p.s.i.g. and heated and passed through a pressure let-down valve to a decanter (such as in Example 1) held at about 215° C. and 400 p.s.i.g. where the solution separates into two immiscible phases. Both upper and lower phases are decanted at a rate such that the interface between phases is held at a constant level. The upper phase is almost pure liquid hexane and is removed through a port at the top of the decanter and a pressure reducing valve; typically this phase contains only about 0.3% low molecular weight polymer. The lower phase contains typically about 56.5% hexane and 43.5% polymer. It is removed through a bottom port and metering pump. A paraffinic petroleum oil ("Sunpar 150") is preheated to about 100° C. and pumped into the lower phase stream and blended therewith in a length of packed pipe. The mixture is passed therefrom through a pressure reducing valve into a flash chamber operating at adiabatic conditions at about 100 mm. Hg absolute pressure. The hexane evaporates producing a dried polymer product containing about 0.25% hexane. The oil is well mixed into the polymer and the product is reasonably free of powdered, fine material. The ratio of oil to polymer in the product can be varied by the rate at which the oil is introduced. Typically from about 0.4 to 1 part of oil is added per part of polymer.

EXAMPLE 3

This example illustrates operation of the invention wherein carbon black is incorporated before decantation.

A 13% n-hexane solution of the polymer of Example 2 is blended with about 70 parts of S.A.F. black per 100 parts of polymer in a blender for a sufficient time to break all large black agglomerates and produce a black-polymer masterbatch of suitable characteristics.

The solution is then heated under pressure of about 1,200 p.s.i. and passed into a decanter operating at about 206° C. and 380 p.s.i.i.a. The hexane phase, decanted from the top, contains only about 0.35% low molecular weight polymer and is, surprisingly, free of carbon black. The lower phase is decanted through a bottom port through a needle valve and is found to contain about 55.5% hexane, 26% polymer and 18.5% carbon black. The bottom phase, when carbon black is present, can be very viscous and present handling problems. The globules of polymer-rich bottom phase sink to the bottom but due to their viscosity do not completely coalesce but do occlude substantial amounts of upper phase solvent. On simple gravity decantation an objectionable amount of solvent may accompany the bottom phase. It may, therefore, be desirable to compact the globules of bottom phase to promote agglomeration and expel the upper phase therefrom. In this way a more homogeneous bottom phase can be decanted.

The lower phase is then passed to a vacuum chamber (100 mm. Hg) wherein the hexane is flashed off leaving only about 0.2% hexane in the product with the carbon black well dispersed therein.

EXAMPLE 4

This example illustrates operation of the invention with the addition of both oil and carbon black before decantation.

A solution containing about 10.3% of the polymer of Example 2, 10.3% well-dispersed ISAF carbon black, 10.4% naphthenic petroleum oil ("Flexon 765") and 69% n-hexane is pressurized and heated before being fed to the decanter operating at 220° C. and 400 p.s.i.g. After decantation, the upper phase is found to contain typically about 3.5% nonvolatiles (mostly all oil) and completely free of carbon black. The lower phase typically contains about 17% polymer, 17% carbon black, 14.9% oil and 51.1% hexane. The lower phase is decanted as described in Example 3 and conducted to a flash chamber maintained at about 100 mm. Hg. After flashing a dried product having only about 0.2% volatiles is typically obtained.

If, for comparison, the above experiment is repeated except that the carbon black is omitted, the upper phase typically will contain substantially more oil.

In practicing the above examples the feed rates are not important as long as care is taken to employ equipment large enough to handle the quantities involved. For example, the flasher must be equipped to withdraw the solvent flashed off and still maintain the desired operating pressure. Determination of such features are well within the skill of the art.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A process for separating an elastomeric copolymer of ethylene and at least one non-conjugated diene from solvent solution wherein the copolymer solution contains less than about one weight percent water and the copolymer contains at least 0.2 gram mole of ethylenic carbon-to-carbon double bonds per kilogram by:
    (a) subjecting the solution to a temperature and pressure at which two liquid phases form including one phase which is rich in copolymer, said temperature being above the precipitation point of the copolymer solution and said pressure being below the pressure where one liquid phase forms and above the pressure where one solvent vapor phase and one solid polymer phase form while maintaining a minimum pressure exceeding the total vapor pressure of the solution;
    (b) separating the copolymer-rich phase; and
    (c) evaporating the solvent from the copolymer-rich phase.

2. The process defined in claim 1 wherein said elastomer is a copolymer of ethylene, propylene and 1,4-hexadiene; the solvent is pentane, hexane or heptane and the solution contains about 5 to 20 percent polymer.

3. The process defined in claim 1 wherein carbon black is added to said solution before separating the copolymer-rich phase.

4. The process defined in claim 3 where processing oil is also added to said solution before separating the copolymer-rich phase.

5. The process defined in claim 1 wherein processing oil is added to the copolymer-rich phase before evaporating the solvent from the copolymer-rich phase.

(References on following page)

References Cited

UNITED STATES PATENTS

| | | |
|---|---|---|
| 2,857,369 | 10/1958 | Johnson. |
| 3,179,642 | 4/1965 | Pflegerl et al. _____ 159—47 |
| 3,234,994 | 2/1966 | Dance. |
| 3,350,370 | 10/1967 | Keller et al. _____ 260—80.78 |
| 3,362,943 | 1/1968 | Edwards et al. _____ 260—93.7 |

FOREIGN PATENTS

| | | |
|---|---|---|
| 991,856 | 5/1965 | Great Britain. |
| 244,131 | 3/1963 | Australia. |

OTHER REFERENCES

Freeman et al.: Polymer, vol. I, pp. 20–26, 1960.
Erlich et al.: J. Poly. Sci., Part A, vol. I, pp. 3217–3229, 1963.
Erlich, J. Poly. Sci., Part A, vol III, pp. 131–136, 1965.

ALLAN LIEBERMAN, Primary Examiner

U.S. Cl. X.R.

159—47; 260—41.5, 80.78, 85.3, 94.9, 96, 704